United States Patent
Salmons et al.

(10) Patent No.: US 10,112,650 B2
(45) Date of Patent: Oct. 30, 2018

(54) VEHICLE FRAME ASSEMBLY

(71) Applicant: Honda Motor Co., Ltd., Tokyo (JP)

(72) Inventors: Neil D. Salmons, Columbus, OH (US); Robb L. Augustine, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 5 days.

(21) Appl. No.: 15/386,536

(22) Filed: Dec. 21, 2016

(65) Prior Publication Data

US 2018/0170433 A1    Jun. 21, 2018

(51) Int. Cl.
| | |
|---|---|
| *B62D 21/02* | (2006.01) |
| *B62D 21/05* | (2006.01) |
| *B62D 25/02* | (2006.01) |
| *B62D 25/20* | (2006.01) |

(52) U.S. Cl.
CPC ............ *B62D 21/02* (2013.01); *B62D 21/05* (2013.01); *B62D 25/025* (2013.01); *B62D 25/2018* (2013.01); *B62D 25/2027* (2013.01); *B62D 25/2036* (2013.01)

(58) Field of Classification Search
CPC ...... B62D 21/02; B62D 21/05; B62D 25/025; B62D 25/2018; B62D 25/2027; B62D 25/2036
See application file for complete search history.

(56) References Cited

U.S. PATENT DOCUMENTS

| | | |
|---|---|---|
| 6,234,568 B1 | 5/2001 | Aoki |
| 6,857,692 B2 | 2/2005 | Cardimen et al. |
| 7,118,167 B2 | 10/2006 | Nakamura et al. |
| 7,222,911 B2 | 5/2007 | Abe et al. |
| 7,954,887 B2 | 6/2011 | Sakamoto et al. |
| 8,376,454 B2 | 2/2013 | Mildner |
| 9,056,635 B2 | 6/2015 | Mildner et al. |
| 9,108,679 B2 | 8/2015 | Mildner et al. |
| 2005/0264042 A1* | 12/2005 | Abe ..................... B62D 25/025 296/203.01 |
| 2011/0001337 A1 | 1/2011 | Patschicke et al. |
| 2014/0239674 A1 | 8/2014 | An et al. |

FOREIGN PATENT DOCUMENTS

| | | |
|---|---|---|
| EP | 0834443 | 4/1998 |
| JP | H0159138 | 4/1986 |

* cited by examiner

*Primary Examiner* — D Glenn Dayoan
*Assistant Examiner* — Melissa A Black
(74) *Attorney, Agent, or Firm* — Rankin, Hill & Clark LLP

(57) ABSTRACT

A vehicle frame assembly includes a main frame part including a side sill extending in a longitudinal direction of the vehicle frame assembly. The side sill has a C-shaped cross-section with a top and bottom walls, an inboard sidewall interconnecting the top and bottom walls, and an open outboard sidewall. A rear frame part is secured to the main frame part and includes a rear frame member extending in the longitudinal direction. The rear frame member has a U-shaped cross-section with an inboard and outboard sidewalls, a bottom wall interconnecting the inboard and outboard sidewalls, and an open top wall. The inboard sidewall at a rearward end portion of the side sill includes a section bulging away from the open outboard sidewall in a lateral direction of the vehicle frame assembly, and the inboard sidewall of the rear frame member is secured to the bulging section of the side sill.

19 Claims, 12 Drawing Sheets

VEHICLE FRAME ASSEMBLY

BACKGROUND

A conventional vehicle frame assembly typically comprises a main frame part and separate front and rear frame parts secured to the main frame part. The main frame part includes laterally spaced side sills, which are the main structural member between the front and rear wheels, and the rear frame part includes laterally spaced rear frame members that are joined to the side sills. The known vehicle frame assembly achieves an improvement in rigidity as a result of joining the side sills to the rear frame members such that each combination forms a substantially continuous frame member along a longitudinal direction of the vehicle frame assembly. However, the conventional rear frame to side sill joint only provides engagement on inboard walls of the respective side sill and rear frame member, and this can affect load transfer along the outboard sidewalls between the side sill and the rear frame member. Because the rear frame member is the primary load path for rear collisions, as well as the primary rear structure for suspension inputs into the vehicle body, it is necessary for the rear frame member to have a strong connecting to the side sill.

BRIEF DESCRIPTION

In accordance with one aspect, a vehicle frame assembly comprises a main frame part including a side sill extending in a longitudinal direction of the vehicle frame assembly. The side sill has a generally C-shaped cross-section with a top wall, a bottom wall, an inboard sidewall interconnecting the top and bottom walls, and an open outboard sidewall. A rear frame part is secured to the main frame part and includes a rear frame member extending in the longitudinal direction. The rear frame member has a generally U-shaped cross-section with an inboard sidewall, an outboard sidewall, a bottom wall interconnecting the inboard and outboard sidewalls, and an open top wall. The inboard sidewall at a rearward end portion of the side sill includes a section bulging away from the open outboard sidewall in a lateral direction of the vehicle frame assembly, and the inboard sidewall of the rear frame member is secured to the bulging section of the side sill.

In accordance with another aspect, a vehicle frame assembly comprises a main frame part including a side sill extending in a longitudinal direction of the vehicle frame assembly. The side sill has a generally C-shaped cross-section with a top wall, a bottom wall, an inboard sidewall interconnecting the top and bottom walls, and an open outboard sidewall. The side sill includes a main portion and a rearward end portion which is separate from the main portion and secured to the main portion. The inboard sidewall at the rearward end portion includes a first section that bulges away from the open outboard sidewall and a second section that extends obliquely toward the open outboard sidewall. A rear frame part includes a rear frame member secured to the rearward end portion of the side sill. The rear frame member extends in the longitudinal direction and has a generally U-shaped cross-section with an inboard sidewall, an outboard sidewall, a bottom wall interconnecting the inboard and outboard sidewalls, and an open top wall. The inboard sidewall of the rear frame member is secured to the bulging first section of the side sill.

In accordance with yet another aspect, a method of assembling a vehicle frame comprises providing a side sill having a generally C-shaped cross-section with a top wall, a bottom wall, an inboard sidewall interconnecting the top and bottom walls, and an open outboard sidewall, a rearward end portion of inboard sidewall including a bulging section; providing a rear frame member having a generally U-shaped cross-section with an inboard sidewall, an outboard sidewall, a bottom wall interconnecting the inboard and outboard sidewalls, and an open top wall; securing the inboard sidewalls of the respective side sill and rear frame member by overlapping the bulging section of the side sill with the inboard sidewall of the rear frame member; securing the outboard sidewalls of the respective side sill and rear frame member by overlapping the outboard sidewall of the rear frame member with the outboard sidewall of the side sill; and securing the bottom walls of the respective side sill and rear frame member by overlapping the bottom wall of the side sill with the bottom wall of the rear frame member.

DETAILED DESCRIPTION

Figure 1:
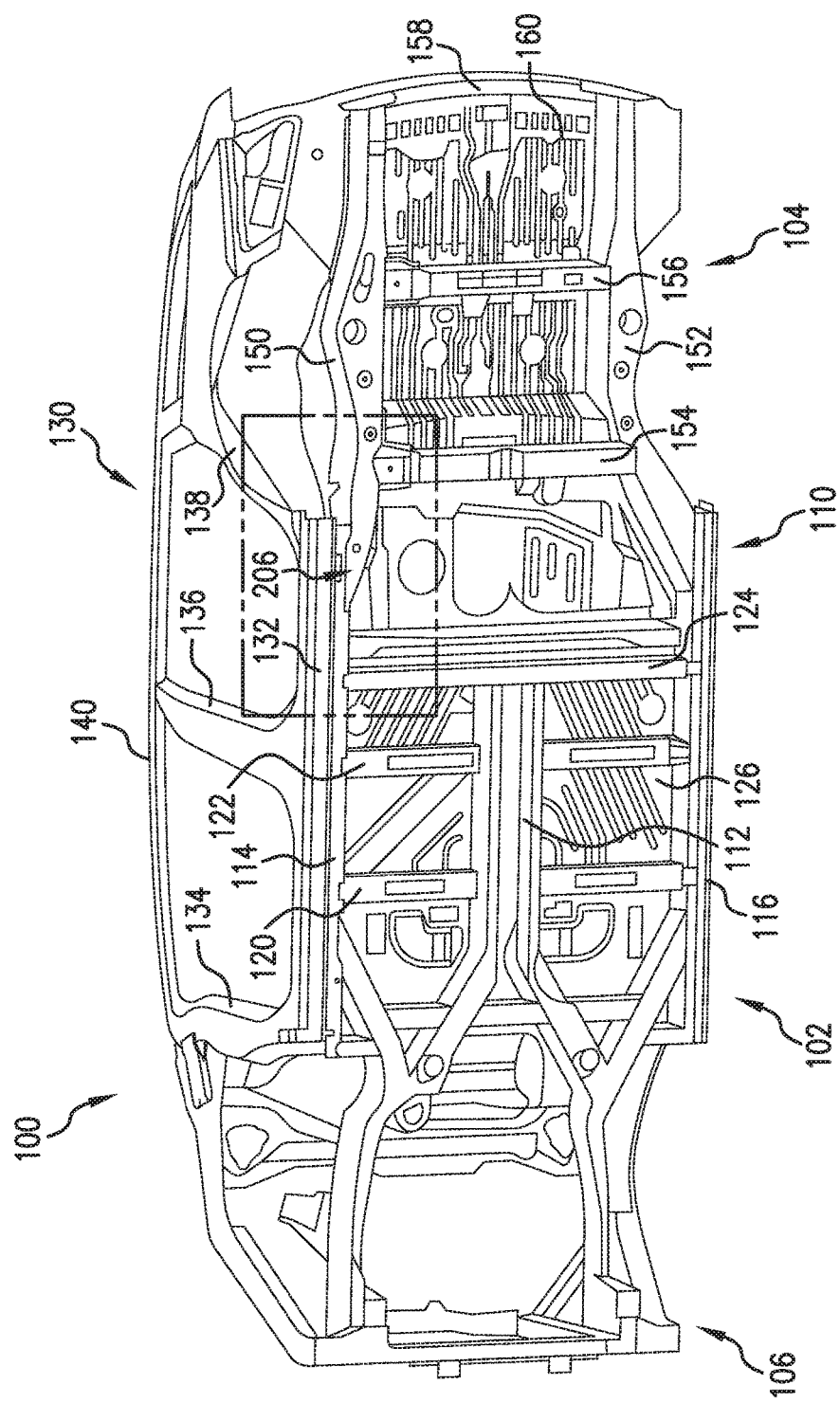
FIG. 1 is an underside perspective view of a known vehicle frame assembly.
Figure 2:
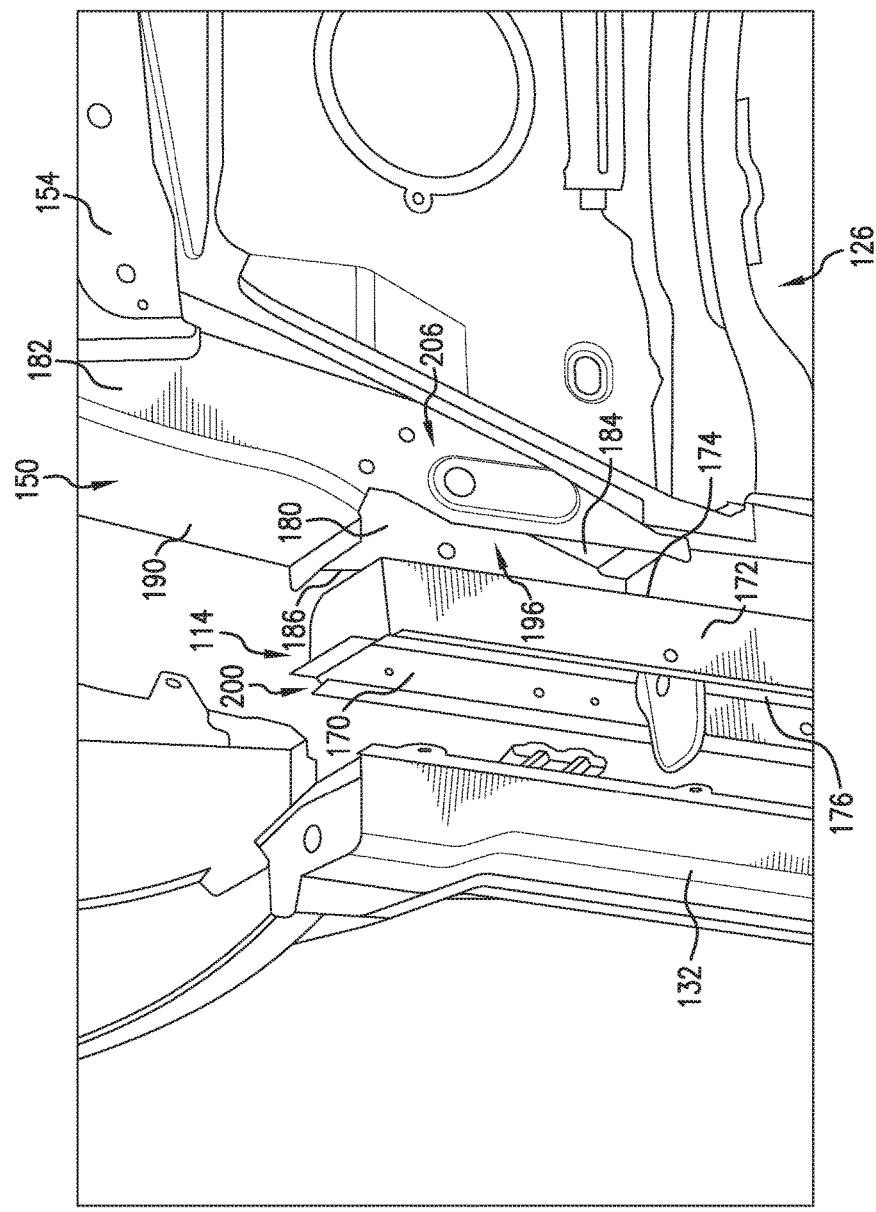
FIGS. 2 and 3 are partially exploded perspective views of a known joint connection between a side sill of a main frame part and a rear frame member of a rear frame part of the known vehicle frame assembly of FIG. 1.
Figure 3:
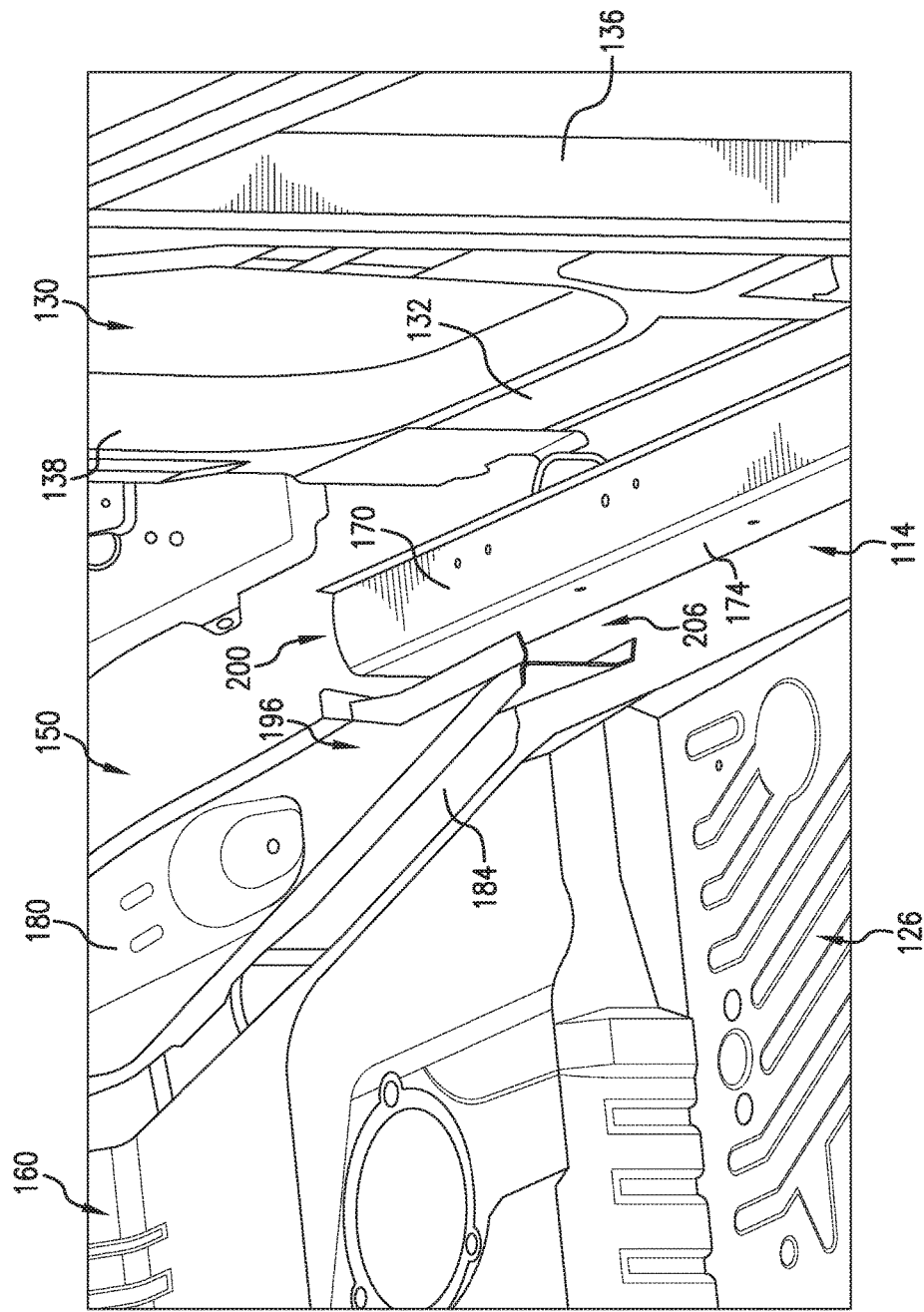
Figure 4:
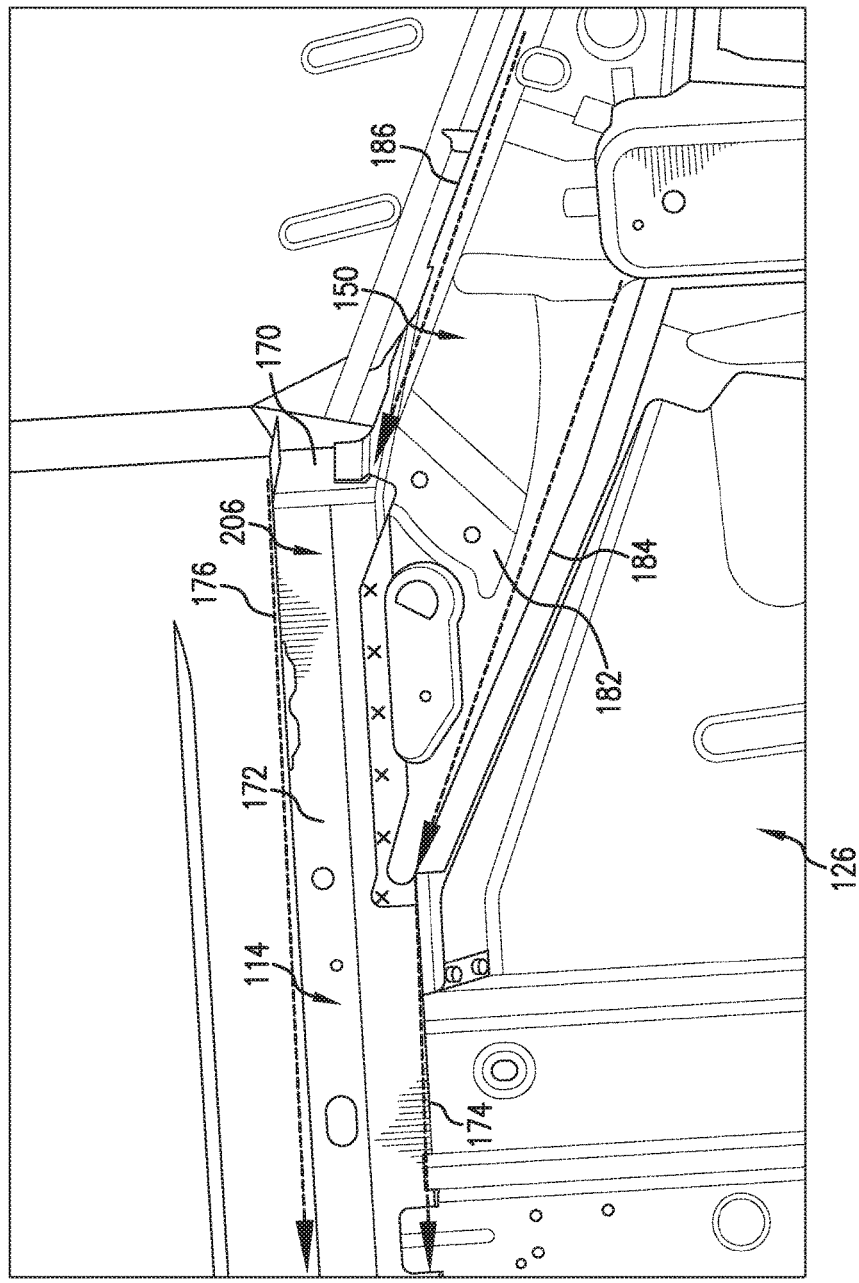
FIG. 4 is an assembled underside perspective view of the known joint connection between the side sill and the rear frame member.
Figure 5:
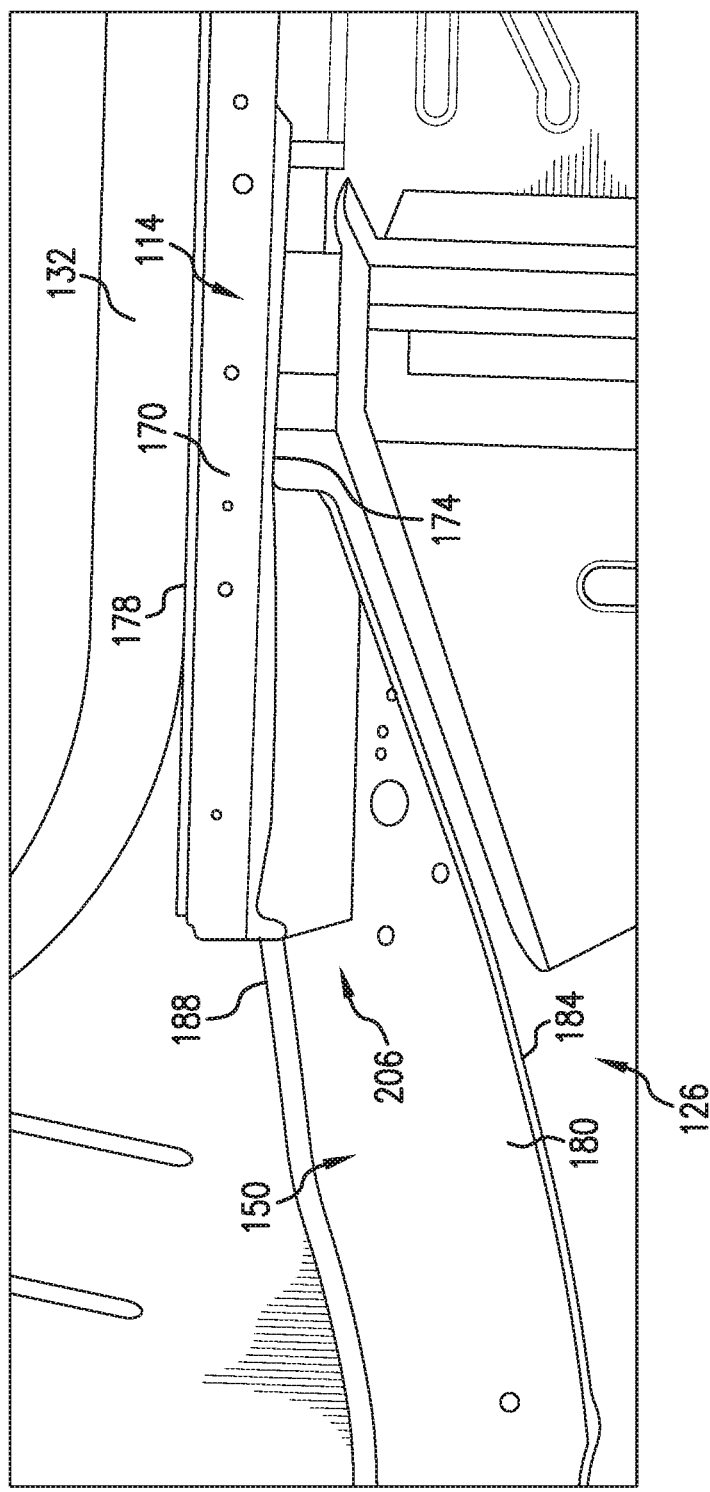
FIG. 5 is an assembled top perspective view of the known joint connection between the side sill and the rear frame member.
Figure 6:
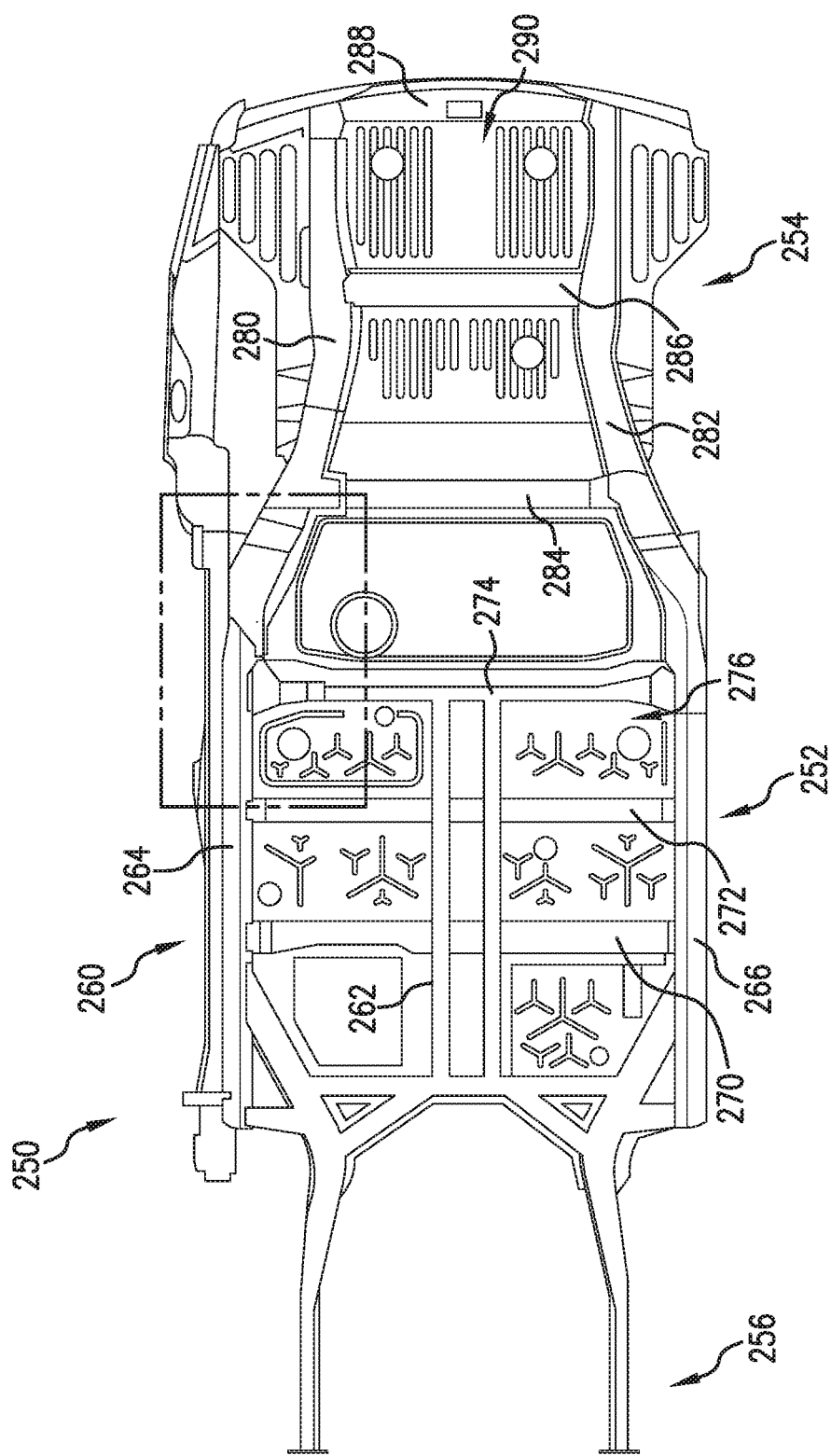
FIG. 6 is an underside perspective view of an exemplary vehicle frame assembly according to the present disclosure.
Figure 7:
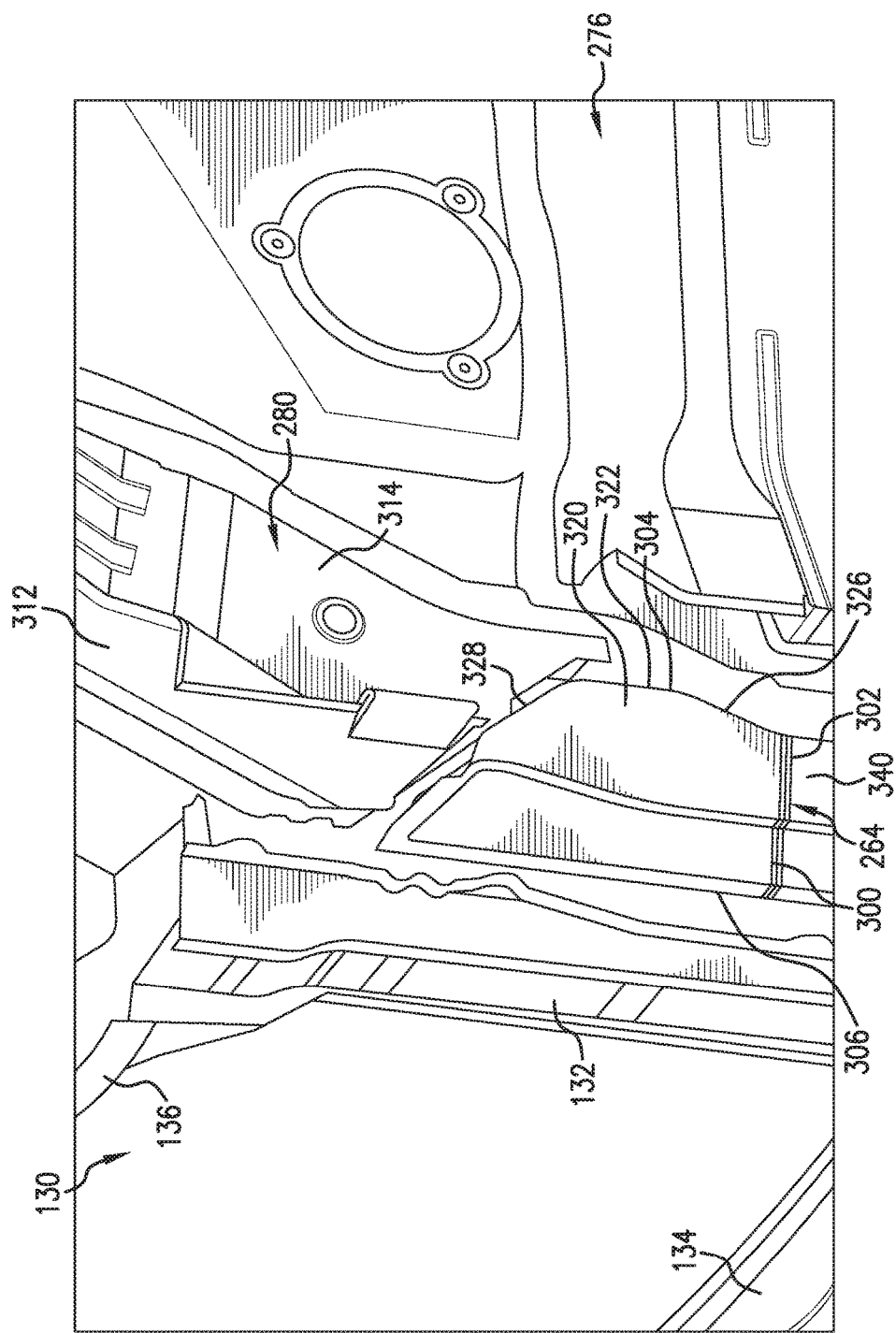
FIGS. 7 and 8 are partially exploded perspective views of an exemplary joint connection between a side sill of a main frame part and a rear frame member of a rear frame part of the exemplary vehicle frame assembly of FIG. 6.
Figure 8:
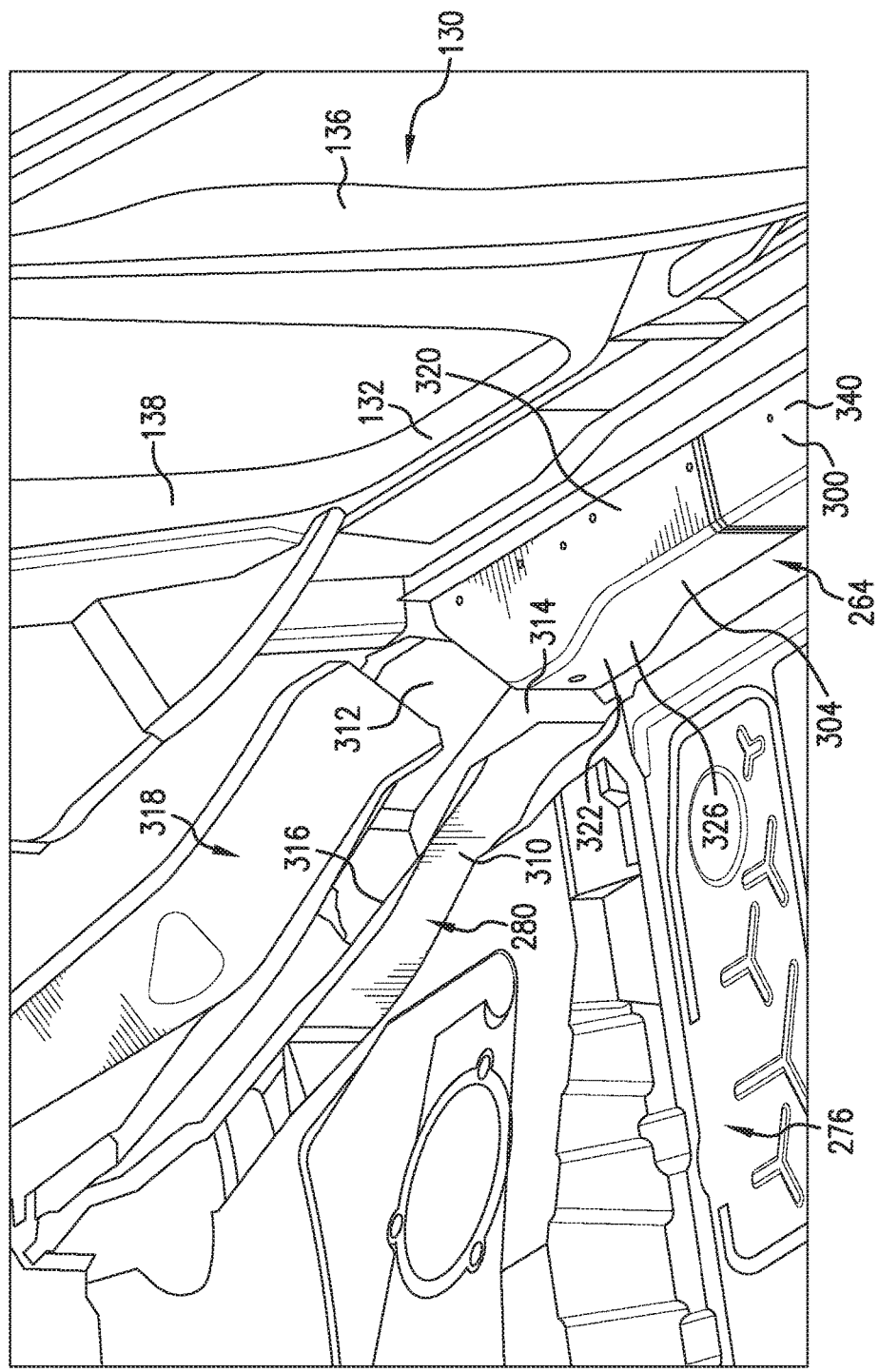

It should, of course, be understood that the description and drawings herein are merely illustrative and that various modifications and changes can be made in the structures disclosed without departing from the present disclosure. It will also be appreciated that the various identified components of the exemplary vehicle frame assembly disclosed herein are merely terms of art that may vary from one manufacturer to another and should not be deemed to limit the present disclosure.

As used herein, lateral directions are transverse across the vehicle frame, i.e., left and right directions and the terms inboard and outboard refer to the lateral directions. Likewise, longitudinal directions refer to forward and rearward directions of vehicle travel, and the vertical directions relate to elevation, i.e., upward and/or downward directions. Moreover, any term of degree used herein, such as "substantially" and "generally" means a reasonable amount of deviation of the modified word is contemplated such that the deviation would not negate the meaning of the word the term of degree modifies.

Referring now to the drawings, wherein like numerals refer to like parts throughout the several views, FIGS. 1-5 illustrate a conventional vehicle frame assembly 100 comprising a main frame part 102, a rear frame part 104, and a front frame part 106, each of the separate rear frame part 104 and front frame part 106 is secured to the main frame part. The main frame part 102 generally comprises a floor frame assembly 110 including a center frame member 112, a pair of side sills 114, 116 extending in the longitudinal direction and flanking the center frame member, cross-members 120, 122, 124 extending in the lateral direction between the side sills 114, 116 and interconnected to the center frame member 112, and a floor panel 126. Side frame assemblies of similar construction (only side frame assembly 130 is visible) are secured to the floor frame assembly 110. The side frame assembly 130 generally includes a lower rail member 132 extending in the longitudinal direction and structural pillars 134, 136, 138 secured at their lower ends to the lower rail member 132 and at their upper ends to a roof rail member 140. The rear frame part 104 generally comprises a pair of rear frame members 150, 152 extending in the longitudinal direction, cross-members 154, 156, 158 extending in the lateral direction between the rear frame members, and a rear floor panel 160.

It should be appreciated that in the longitudinal direction, the known vehicle frame assembly 100 is of symmetrical design on each of lateral sides of the vehicle frame assembly 100; therefore only one lateral side of the vehicle frame assembly 100 will be described in detail. With reference to FIGS. 2-5, the side sill 114 is a one-piece frame member having a generally C-shaped cross section normal to the longitudinal direction with a substantially constant cross-sectional dimension along its longitudinal extent. The side sill 114 includes a top wall 170, a bottom wall 172, an inboard sidewall 174 interconnecting the top and bottom walls, and an open outboard sidewall 176. It should be appreciated that the outboard sidewall 176 of the side sill 114 is secured to the lower rail member 132 of the side frame assembly 130. The rear frame member 150 also has a generally C-shaped in cross-section normal to the longitudinal direction and includes a top wall 180, a bottom wall 182, an inboard sidewall 184 interconnecting the top and bottom walls, and an open outboard sidewall 186. As used herein, the term open means that each of the outboard sidewalls 176, 186 includes an elongated channel defined therein that extends along its entire longitudinal extent. A cover member 190 covers the outboard sidewall 186 except at a forward end portion 196 of the rear frame member 150 where the inboard sidewall 184 at the forward end portion 196 converges toward the outboard sidewall 186. In assembly, the forward end portion 196 of the rear frame member 150 is secured (e.g., by welding) to a rearward end portion 200 of the side sill 114 in an arrangement where both the inboard and outboard sidewalls 184, 186 of the rear frame member 150 are fixed to the inboard sidewall 174 of the side sill 114. As depicted by the dashed lines in FIG. 4, this arrangement provides continuity on the inboard sidewalls 174, 184 at a joint connection 206 between the side sill 114 and the rear frame member 150. However, at the joint connection 206, the outboard sidewall 176 of the side sill 114 is laterally offset from the outboard sidewall 186 of the rear frame member 150, and this discontinuity on the outboard sidewalls 176, 186 at the joint connection 206 can affect the load transfer between the side sill 114 and the rear frame member 150.

FIGS. 6-12 illustrate an exemplary vehicle frame assembly 250 according to the present disclosure. The vehicle frame assembly 250 comprises a main frame part 252, a rear frame part 254, and a front frame part 256, each of the separate rear frame part 254 and front frame part 256 is secured to the main frame part. The main frame part 252 generally comprises a floor frame assembly 260 including a center frame member 262, a pair of laterally spaced side sills 264, 266 extending in the longitudinal direction and flanking the center frame member, cross-members 270, 272, 274 extending in the lateral direction between the side sills 264, 266 and interconnected to the center frame member 262, and a floor panel 276. Side frame assemblies similar in construction to the side frame assembly 130 described above are secured to the floor frame assembly 260. The rear frame part 254 generally comprises a pair of laterally spaced rear frame members 280, 282 extending in the longitudinal direction, cross-members 284, 286, 288 extending in the lateral direction between the rear frame members, and a rear floor panel 290.

Again, it should be appreciated that in the longitudinal direction, the exemplary vehicle frame assembly 250 is of symmetrical design on each of lateral sides of the vehicle frame assembly 250; therefore only one side of the vehicle frame assembly 250 will be described in detail. With reference to FIGS. 7-10, the side sill 264 of the main frame part 252 has a generally C-shaped cross section normal to the longitudinal direction with a top wall 300, a bottom wall 302, an inboard sidewall 304 interconnecting the top and bottom walls, and an open outboard sidewall 306. The rear frame member 280 is generally U-shaped in cross-section normal to the longitudinal direction with an inboard sidewall 310, an outboard sidewall 312, a bottom wall 314 interconnecting the inboard and outboard sidewalls, and an open top wall 316. As used herein, the term open means that each of the outboard sidewalls 306 and the top wall 316 includes an elongated channel defined therein that extends along its entire longitudinal extent. A rear frame cover 318 is secured to and is configured to cover the open top wall 316 of the rear frame member 280. In assembly, the rear frame cover 318 can at least partially overlap the top wall 300 of the side sill 264.

In the depicted aspect, the side sill 264 can have a substantially constant cross-sectional dimension along its longitudinal extent except for a rearward end portion 320 of the side sill 264. According to the present disclosure, the rearward end portion 320 of the side sill 264 includes a section 322 bulging away from the outboard sidewall 306 in the lateral direction. More particularly, the bulging section 322 of the side sill includes a first section 326 that bulges away from the outboard sidewall 306 and a second section 328 rearward of the first section 326 that extends obliquely toward the outboard sidewall 306. In the depicted embodiment, the second section 328 intersects the outboard sidewall 306 and defines an end wall of the side sill 264. An opening 334 is provided in and is framed by the second section 328. In assembly, the opening 334 can allow for the flow of structural foam and/or anticorrosion fluid, such as e-coat, to pass therethrough. Further, for ease of manufacturing of the side sill 264, the side sill includes a main portion 340 and the rearward end portion 320, and the rearward end portion 320 is a side sill extension part that is separate from the main portion 340 and secured (e.g., by welding) to the main portion 340. This aspect is best depicted in FIGS. 9 and 10 which show an overlapping arrangement between the top and bottom walls of the respective rearward end portion 320 and the main portion 340 and an overlapping arrangement between the inboard and outboard sidewalls of the respective rearward end portion 320 and the main portion 340.

Figure 9:
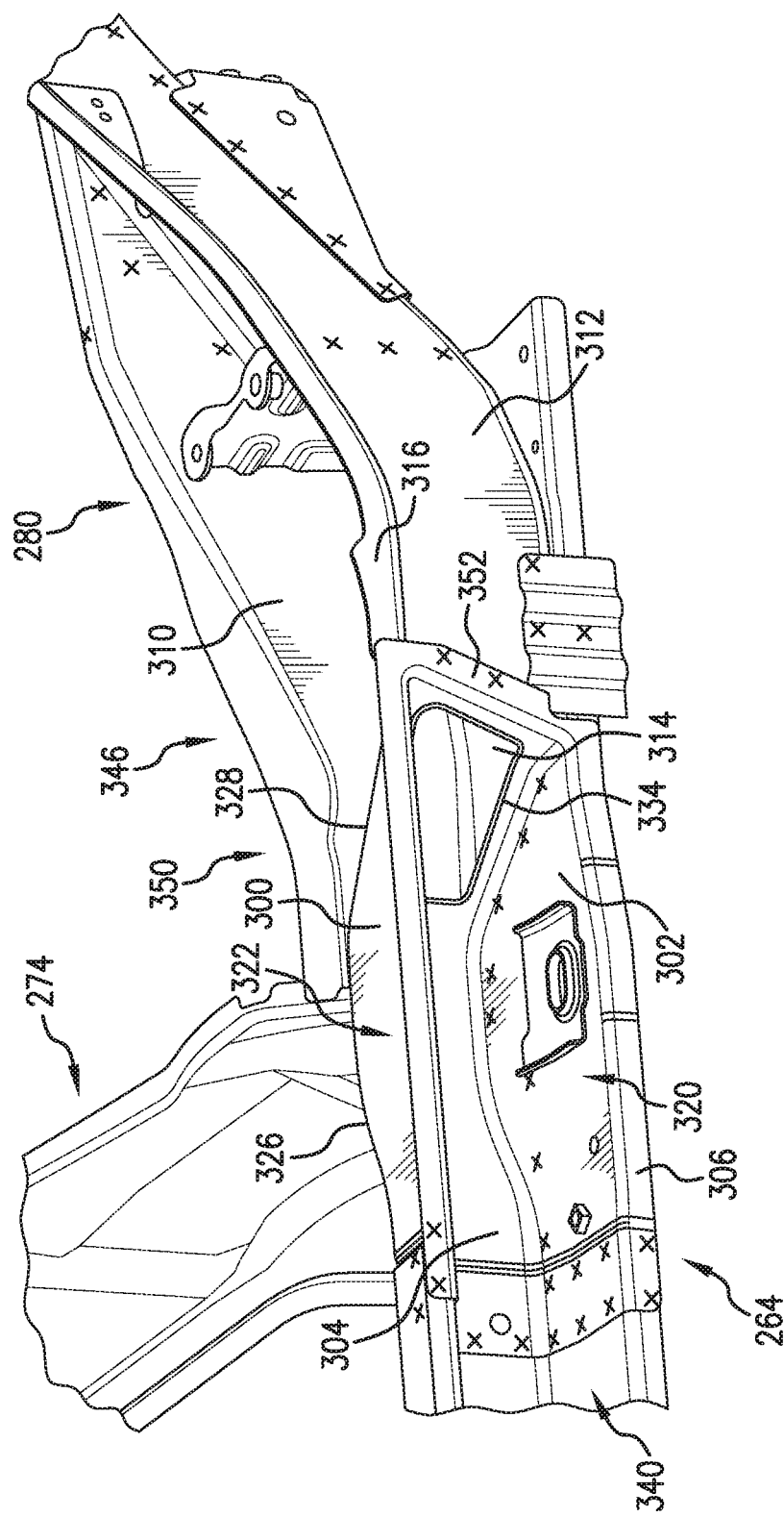
FIGS. 9 and 10 are assembled perspective views of the exemplary joint connection between the side sill and the rear frame member.
Figure 10:
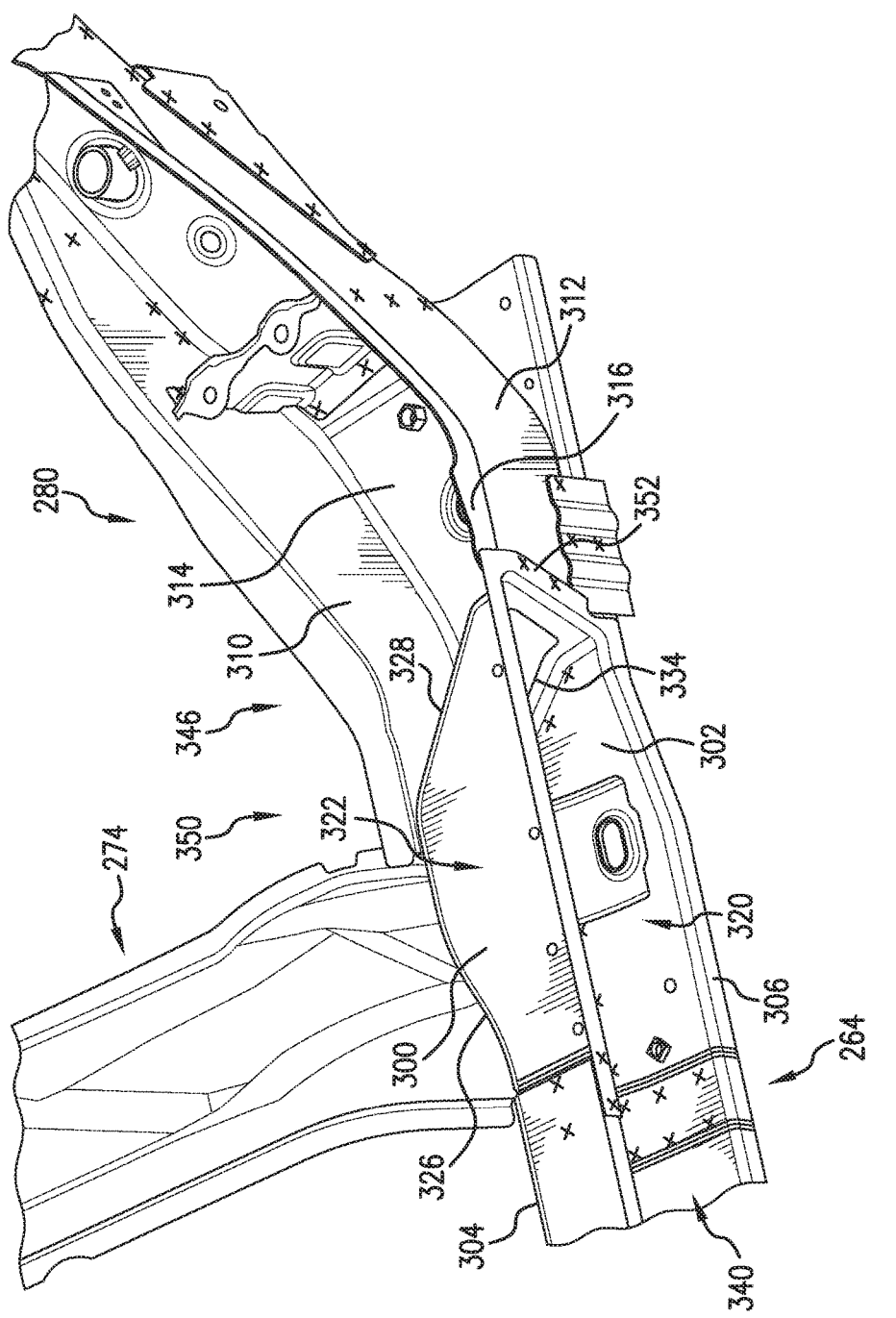
Figure 11:
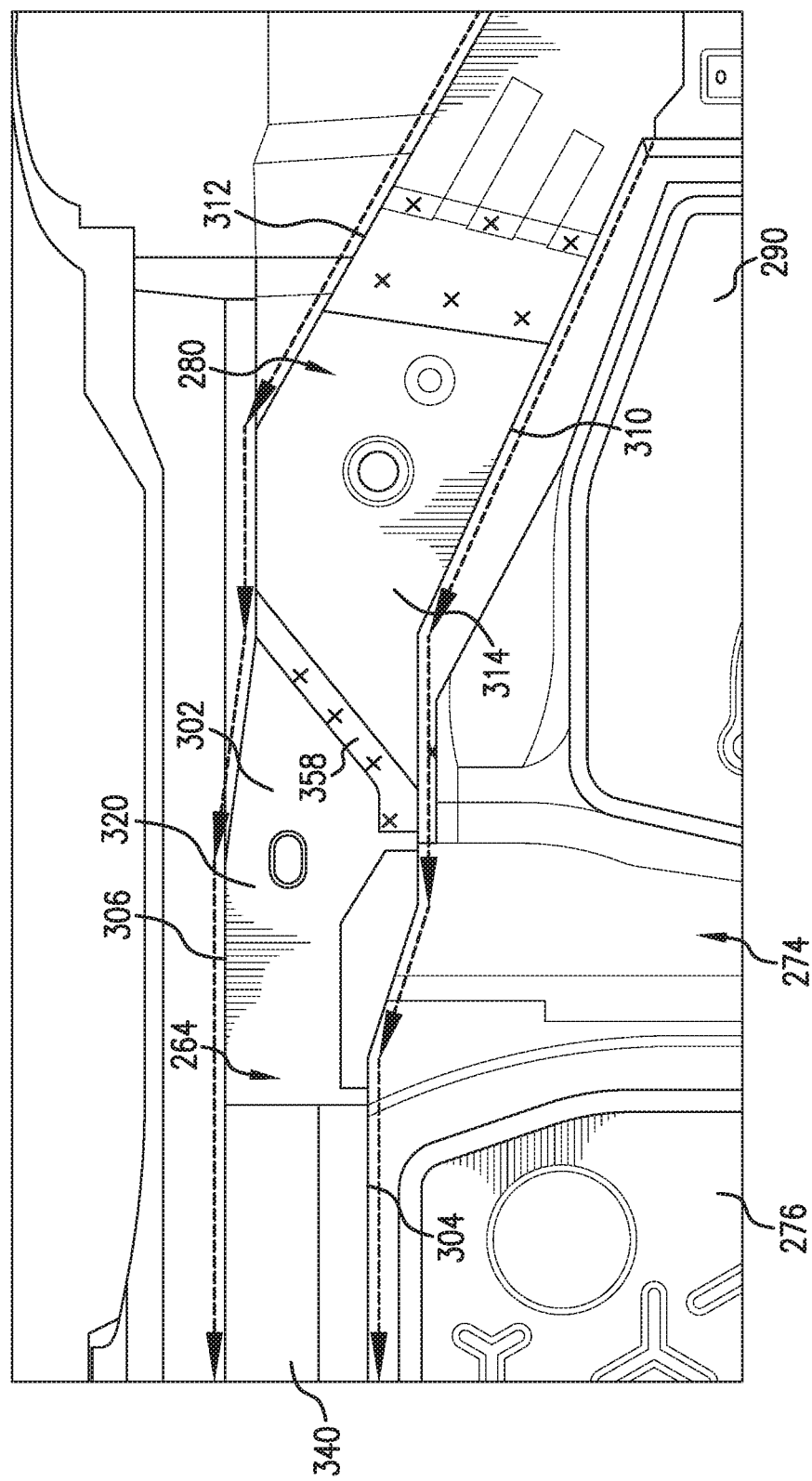
FIG. 11 is an assembled underside perspective view of the exemplary joint connection between the side sill and the rear frame member.
Figure 12:
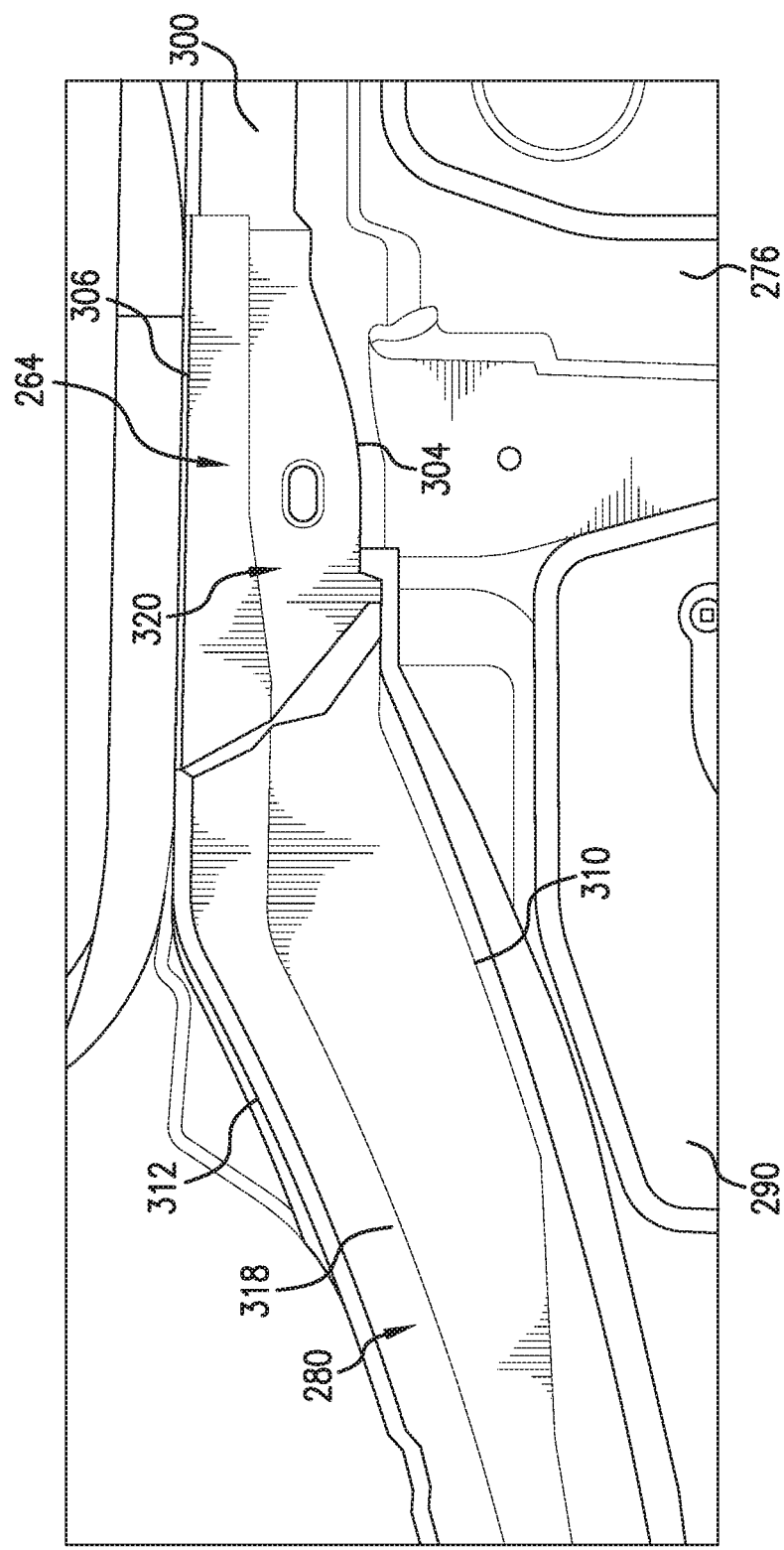
FIG. 12 is an assembled top perspective view of the exemplary joint connection between the side sill and the rear frame member.

With reference to FIGS. 9 and 10, the rearward end portion 320 of the side sill 264 and forward end portion 346 the rear frame member 280 are arranged to have an overlapping configuration along each of the inboard sidewall 310, outboard sidewall 312 and bottom wall 314 of the rear frame member 280. This overlapping configuration defines a joint connection 350 between the side sill 264 and the rear frame member 280. More particularly, the outboard sidewall 306 of the side sill 264 includes a flange 352 overlapping and secured to (e.g., by welding) the outboard sidewall 312 of the rear frame member 280, which has an edge at the intersection of the second section 328 of the inboard sidewall 304 and the outboard sidewall 306 of the side sill. The inboard sidewall 310 of the rear frame member 280 overlaps and is secured (e.g., by welding) to the first section 326 of the bulging section 322 of the inboard sidewall 304 of the side sill 264. The bottom wall 314 of the rear frame member 280 includes a flange 358 overlapping the bottom wall 302 of the side sill 264 (see FIG. 11). The cross member 274 extending in the lateral direction has an end portion secured to the bulging section 322 of the side sill. According to this aspect, the bulging section 322 is laterally aligned with the cross member 274.

The overlapping arrangements at the joint connection 350 of the inboard sidewalls 304, 310 and of outboard sidewalls 306, 312 the respective side sill 264 and rear frame member 280 are along the longitudinal direction. As depicted by the dashed lines in FIG. 11 and in contrast to the known vehicle frame assembly 100, this overlapping arrangement of inboard sidewalls 304, 310 and of outboard sidewalls 306, 312 the respective side sill 264 and rear frame member 280 allows for continuity between the side sill 264 and rear frame member 280 along both the inboard sidewalls and the outboard sidewalls in the longitudinal direction which facilitates load transfer between the inboard sidewalls and the outboard sidewalls. The overlapping arrangement at the joint connection 350 of the bottom walls 302, 314 of the respective side sill 264 and rear frame member 280 is canted rearward from the inboard sidewalls to the outboard sidewalls relative to the longitudinal direction. Accordingly, the exemplary vehicle frame assembly 250 improves rear crash efficiency and body rigidity, enabling a stronger, stiffer structure with less weight than the known vehicle frame assembly 100.

As is evident from the foregoing, the present disclosure provides an exemplary method of assembling a vehicle frame 250. The exemplary method generally comprises providing a side sill 264 having a generally C-shaped cross-section with a top wall 300, a bottom wall 302, an inboard sidewall 304 interconnecting the top and bottom walls, and an open outboard sidewall 306, a rearward end portion 320 of inboard sidewall 304 including a bulging section 322; providing a rear frame member 280 having a generally U-shaped cross-section with an inboard sidewall 310, an outboard sidewall 312, a bottom wall 314 interconnecting the inboard and outboard sidewalls, and an open top wall 316; securing the inboard sidewalls 304, 310 of the respective side sill 264 and rear frame member 280 by overlapping the bulging section 322 of the side sill 264 with the inboard sidewall of the rear frame member 280; securing the outboard sidewalls 306, 312 of the respective side sill 264 and rear frame member 280 by overlapping the outboard sidewall of the rear frame member 280 with the outboard sidewall of the side sill 264; and securing the bottom walls 302, 314 of the respective side sill 264 and rear frame member 280 by overlapping the bottom wall of the side sill with the bottom wall of the rear frame member. According to one aspect, the rearward end portion 320 of the side sill 264 is a side sill extension part that is separate from a main portion 340 of the side sill, and the exemplary method includes securing the rearward end portion 320 to the main portion 340. The exemplary method further including securing a rear frame cover 318 to the open top wall 316 of the rear frame member 280.

It will be appreciated that the above-disclosed features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle frame assembly comprising:
  a main frame part including a side sill extending in a longitudinal direction of the vehicle frame assembly, the side sill having a generally C-shaped cross-section with a top wall, a bottom wall, an inboard sidewall interconnecting the top and bottom walls, and an open outboard sidewall; and
  a rear frame part secured to the main frame part and including a rear frame member extending in the longitudinal direction, the rear frame member having a generally U-shaped cross-section with an inboard sidewall, an outboard sidewall, a bottom wall interconnecting the inboard and outboard sidewalls, and an open top wall,
  wherein the inboard sidewall at a rearward end portion of the side sill includes a section bulging away from the open outboard sidewall in a lateral direction of the vehicle frame assembly, and the inboard sidewall of the rear frame member is secured to the bulging section of the side sill,
  wherein the rearward end portion of the side sill and the rear frame member are arranged to have an overlapping configuration along each of the inboard sidewall, outboard sidewall and bottom wall of the rear frame member.

2. The vehicle frame assembly of claim 1, wherein the bulging section of the side sill includes a first section that bulges away from the open outboard sidewall and a second section rearward of the first section that extends obliquely toward the open outboard sidewall.

3. The vehicle frame assembly of claim 2, wherein the second section intersects the open outboard sidewall.

4. The vehicle assembly of claim 3, wherein an opening is provided in the second section.

5. The vehicle assembly of claim 1, wherein the open outboard sidewall of the side sill includes a flange overlapping the outboard sidewall of the rear frame member.

6. The vehicle assembly of claim 5, wherein the inboard sidewall of the rear frame member overlaps the bulging section of the inboard sidewall of the side sill.

7. The vehicle assembly of claim 6, wherein the bottom wall of the rear frame member includes a flange overlapping the bottom wall of the side sill.

8. The vehicle assembly of claim 7, wherein the overlapping arrangements of outboard sidewalls and the inboard sidewalls of the respective side sill and rear frame member are along the longitudinal direction and the overlapping arrangement of the bottom walls of the respective side sill and rear frame member is canted rearward from the inboard sidewalls to the outboard sidewalls relative to the longitudinal direction.

9. The vehicle assembly of claim 8, wherein the overlapping arrangement of the inboard sidewalls and the outboard sidewalls of the respective side sill and rear frame member allows for continuity between the side sill and rear frame member along both the inboard sidewalls and the outboard sidewalls in the longitudinal direction which facilitates load transfer between the inboard sidewalls and the outboard sidewalls.

10. The vehicle assembly of claim 1, wherein the side sill includes a main portion and the rearward end portion which is separate from the main portion and secured to the main portion.

11. The vehicle assembly of claim 10, further comprising a cross member extending in the lateral direction and having an end portion secured to the bulging section of the side sill.

12. The vehicle assembly of claim 10, further comprising a rear frame cover configured to cover the open top wall of the rear frame member, the rear frame cover overlapping the top wall of the side sill.

13. A vehicle frame assembly comprising:
a main frame part including a side sill extending in a longitudinal direction of the vehicle frame assembly, the side sill having a generally C-shaped cross-section with a top wall, a bottom wall, an inboard sidewall interconnecting the top and bottom walls, and an open outboard sidewall, wherein the side sill includes a main portion and a rearward end portion which is separate from the main portion and secured to the main portion, the inboard sidewall at the rearward end portion includes a first section that bulges away from the open outboard sidewall and a second section that extends obliquely toward the open outboard sidewall; and
a rear frame part including a rear frame member secured to the rearward end portion of the side sill, the rear frame member extending in the longitudinal direction and having a generally U-shaped cross-section with an inboard sidewall, an outboard sidewall, a bottom wall interconnecting the inboard and outboard sidewalls, and an open top wall, wherein the inboard sidewall of the rear frame member is secured to the bulging first section of the side sill.

14. The vehicle frame assembly of claim 13, wherein the second section intersects the open outboard sidewall, and an opening is provided in and framed by the second section.

15. The vehicle assembly of claim 13, wherein the rearward end portion of the side sill and the rear frame member are arranged to have an overlapping configuration along each of the inboard sidewall, outboard sidewall and bottom wall of the rear frame member.

16. The vehicle assembly of claim 15, wherein the open outboard sidewall of the side sill includes a flange overlapping the outboard sidewall of the rear frame member, the inboard sidewall of the rear frame member overlaps the bulging first section of the inboard sidewall of the side sill, and the bottom wall of the rear frame member includes a flange overlapping the bottom wall of the side sill.

17. A method of assembling a vehicle frame comprising:
providing a side sill having a generally C-shaped cross-section with a top wall, a bottom wall, an inboard sidewall interconnecting the top and bottom walls, and an open outboard sidewall, a rearward end portion of inboard sidewall including a bulging section;
providing a rear frame member having a generally U-shaped cross-section with an inboard sidewall, an outboard sidewall, a bottom wall interconnecting the inboard and outboard sidewalls, and an open top wall;
securing the inboard sidewalls of the respective side sill and rear frame member by overlapping the bulging section of the side sill with the inboard sidewall of the rear frame member;
securing the outboard sidewalls of the respective side sill and rear frame member by overlapping the outboard sidewall of the rear frame member with the outboard sidewall of the side sill; and
securing the bottom walls of the respective side sill and rear frame member by overlapping the bottom wall of the side sill with the bottom wall of the rear frame member.

18. The method of claim 17, wherein the rearward end portion of the side sill is separate from a main portion of the side sill, and the method includes securing the rearward end portion to the main portion.

19. The method of claim 17, further including securing a rear frame cover to the open top wall of the rear frame member.

* * * * *